P. BOSTROM.
Grain-Drills.
No. 154,169. Patented Aug. 18, 1874.
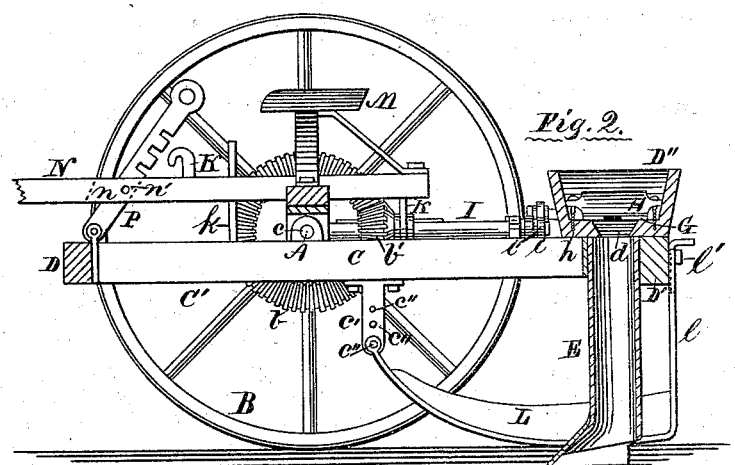
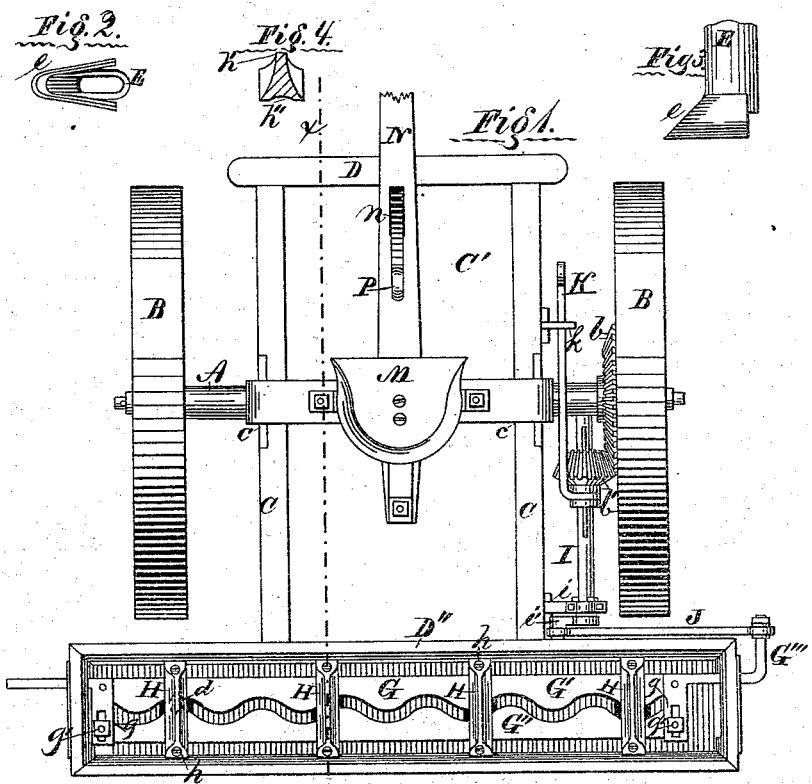

UNITED STATES PATENT OFFICE.

PETER BOSTROM, OF GALESBURG, ILLINOIS.

IMPROVEMENT IN GRAIN-DRILLS.

Specification forming part of Letters Patent No. 154,169, dated August 18, 1874; application filed June 9, 1874.

*To all whom it may concern:*

Be it known that I, PETER BOSTROM, of Galesburg, county of Knox and State of Illinois, have invented certain Improvements in Grain-Drills, of which the following is a specification:

The present invention relates to improvements in machines for sowing grain in drills; and the invention consists partly in improvements in the seed-slide, and partly in improvements in the cut-offs, all as hereinafter fully described.

To enable others skilled in the art to make and use my invention, I will now proceed to described the same, with reference to the accompanying drawing, in which—

Figure 1 is a top or plan view of a machine embodying my invention. Fig. 2 is a vertical sectional view of Fig. 1, on the line $x\ x$; and Figs. 3, 4, and 5 are detail views hereinafter referred to.

Referring to the parts by letters, letter A represents the axle, carried on wheels B B. C C are the side bars, and D D' the front and rear transverse bars, respectively, which connect them and form a frame, C'. The side bars C C are pivoted to the vertical parts of the axle A, a little forward of their centers, at $c$, so that their rear ends may be raised or lowered or oscillated in a vertical plane. D'' is the seed-box or hopper, mounted upon and extending across the rear ends of the bars C C. The bottom of the seed-box D'' may be pierced with any number desired of holes, $d$, each hole $d$ communicating with a seed-tube, E. The lower ends of the seed-tubes E project forward, as shown at Figs. 2 and 3, and have attached at their forward lower ends and sides steel shoes $e$, formed as shown at Figs. 2 and 3, to open the furrows for the reception of the seed, and allow the soil to fall back over their rear ends to cover the same. G is the seed-slide, formed of two bars, G' G'', their adjacent sides formed alike, each being alternately concave and convex or undulating in form, and arranged relatively to each other, each with its concave parts opposite the convex parts of its fellow, so that their line of union forms a sinuous or waved line, as shown at Fig. 1. The slide G' is provided with lateral slotted arms $g\ g$, through which bolts $g'$ project upward from the bar G'', and are provided at their upper ends with nuts, by means of which they may be secured and the distance between the bars G' G'' be thus adjusted as desired. Letters H represent the cut-offs, arranged as shown at Fig. 1, one over each of the holes $d$, and are secured in the bottom of the seed-box by a screw, $h$, at each end. The cut-offs H are formed in their cross-section as shown at Fig. 4, with a contracted side or edge, $h'$, and a broad edge, $h''$, on the opposite side, the broad edge slightly concave, as shown at said cross-section. $b$ is a bevel-gear, secured to and rotating with one of the wheels B. $b'$ is a sliding pinion, carried on a shaft, I, the rear end of which has a bearing in a standard, $i$, and the forward end in an elongated hole in one arm of the axle A. J is a connecting-rod, extending from a crank, $i'$, on the shaft I to an arm, G''', which extends outward from the seed-bar G. K is a shipping-rod, its rear end forked and engaging with a grooved boss projecting from the rear side of the pinion $b'$, its forward end passing through a slotted standard, $k$, where it may be secured by notches on its lower edge. G''' is an arm projecting from the end of the bar G, outward through the end of the seed-box. L represents runners, one of which is suspended beneath each bar C, their forward ends pivoted or hinged to pendants $c'$, from the bars C by a bolt, $c''$, which passes through either of a series of holes, $c'''$, and their rear ends having straps $l$, which extend upward and are pierced with slots, through which bolts $l'$ pass to secure them to the rear frame-bar D'. M is the driver's seat, mounted on the axle A. N is the tongue or draft-pole, having a solid connection to the axle A and pierced with a slot at $n$, through which a rack-bar, P, passes upward from a hinged connection to the forward bar D. In ordinary use, the bar P works freely through the slot $n$; but when it is desired to elevate, for transportation or other purpose, the drills, the forward end of the frame C' may be pressed downward and a pin passed through the hole $n'$ in the tongue, to engage with the rack-bar P and hold the rear end in an elevated position.

The manner of transmitting a reciprocating motion to the slide G is deemed obvious, as is also the manner of adjusting the distance of the bars G' G" apart, to regulate the discharge of seed, and also to suit varying size of seed. The cut-offs H can be inverted for the same purpose, their narrow sides h' facilitating the passage of seed, and favoring especially the passage of the larger class of seeds, when downward. The forward and rear ends of the runners L may be raised or lowered, to regulate the depth of sowing, by regulating the depth of penetration by the shoes e. The manner of throwing the sliding pinion b' out of gear with the pinion b, by means of the shipping-rod K, is obvious.

What I claim as new, and desire to secure by Letters Patent, is—

1. In a seeding-machine, the two bars G' G", curved as shown, and arranged to operate in combination with the seed-tubes E, substantially as and for the purpose specified.

2. The combination of the bars G' G", box D", and reversible cut-offs H, the latter having inwardly-grooved tapering sides, as shown and described, for the purpose specified.

PETER BOSTROM.

Witnesses:
J. J. TUNNICLIFF,
M. D. COOKE.